United States Patent
Ogilvie (10) Patent No.: US 8,575,790 B1
(45) Date of Patent: Nov. 5, 2013

(54) SUPERCONDUCTING ELECTRODYNAMIC TURBINE

(76) Inventor: William Ivan Ogilvie, Mountain View, CA (US)

(*) Notice: Subject to any disclaimer, the term of this patent is extended or adjusted under 35 U.S.C. 154(b) by 896 days.

(21) Appl. No.: 12/799,730

(22) Filed: May 1, 2010

Related U.S. Application Data (60) Provisional application No. 61/215,734, filed on May 8, 2009.

(51) Int. Cl.
*H02K 41/02* (2006.01)
*H02K 15/12* (2006.01)
*H02K 3/00* (2006.01)
*F17C 3/10* (2006.01)

(52) U.S. Cl.
USPC ............ 310/12.04; 310/46; 310/179; 62/48.2

(58) Field of Classification Search
USPC ............. 310/12.04, 46, 179; 123/3; 324/318; 62/48.2; 242/430
See application file for complete search history.

(56) References Cited

U.S. PATENT DOCUMENTS

| | | | |
|---|---|---|---|
| 3,504,868 A | 4/1970 | Engelberger | |
| 5,017,549 A | 5/1991 | Robertson | |
| 5,093,313 A | 3/1992 | Minovitch | |
| 5,130,686 A | 7/1992 | Leupold | |
| H1605 H | 11/1996 | Leupold | |
| 6,116,544 A | 9/2000 | Forward | |
| 6,242,689 B1 | 6/2001 | Budge | |
| 6,260,807 B1 | 7/2001 | Hoyt | |
| 6,318,666 B1 | 11/2001 | Brotz | |
| 6,565,044 B1 | 5/2003 | Johnson | |
| 6,921,042 B1 * | 7/2005 | Goodzeit et al. | 242/430 |
| 6,942,186 B1 | 9/2005 | Levin | |
| 7,372,273 B2 * | 5/2008 | Huang et al. | 324/318 |
| 7,446,636 B1 | 11/2008 | Below | |
| 7,498,915 B1 | 3/2009 | Leupold | |
| 7,641,151 B2 | 1/2010 | Janhunen | |
| 2009/0314269 A1 * | 12/2009 | Victor et al. | 124/3 |

OTHER PUBLICATIONS

R.J.R. Ladoucer, Major Rcaf, "Shielded Coil Electrodynamic Propulsion (SCEP) A Feasibility Study", Thesis, Dec. 16, 1993, 95 pages, AFIT/GSO/ENY/93D-6, Air Force Institute of Technology, WPAFB OH 45433-6538.

* cited by examiner

*Primary Examiner* — Tran Nguyen
*Assistant Examiner* — Jose Gonzalez Quinones (57) ABSTRACT

The Superconducting Electrodynamic Turbine produces thrust by transferring momentum to the Earth, via the geomagnetic field. A pair of counter-rotating electrodynamic rotors, that are made from a Superconductor, act together to displace the surrounding geomagnetic field. The rotation of a Superconductor in the geomagnetic field, referred to as the exciting field, creates persistent eddy currents in the Superconductor. Lenz's Law states that an induced eddy current produces a magnetic field that opposes the relative change in the exciting field. A continuous increment of energy, or work, has to be expended to overcome the opposing force and to keep the counter-rotating electrodynamic rotors rotating at a constant rate. This work is transferred to the magnetic field. The Electrodynamic Turbine produces a unidirectional displacement in the exciting magnetic field, creating a force or thrust. The magnitude of the force can be modulated by changing the rotational speed of the electrodynamic rotors and the direction of the thrust can be reversed by reversing the direction of rotation. The Electrodynamic Turbine can also be used to convert momentum, in the presence of an exciting field, to rotational kinetic energy for power generation.

5 Claims, 8 Drawing Sheets

SUPERCONDUCTING ELECTRODYNAMIC TURBINE

CROSS-REFERENCE TO RELATED APPLICATIONS

This application claims the benefit of provisional patent application Ser. No. 61/215,734 Filed 2009 May 8 by the present inventor.

FEDERALLY SPONSORED RESEARCH

Not Applicable

SEQUENCE LISTING OR PROGRAM

Not Applicable

BACKGROUND

1. Field

The invention concerns generally the technology of spacecraft propulsion. Specifically the invention concerns the technology of using electrical power to produce thrust by displacing the geomagnetic field in the vicinity of a spacecraft.

2. Prior Art

Spacecraft currently require rocket engines to maneuver while in orbit and to change their orbit. When a satellite has used up all its propellant, its orbit gradually changes until the satellite can no longer be used for its intended purpose. For this reason it is customary to de-orbit a satellite before its propellant has been completely expended; regardless of the health of its electronic systems. If a spacecraft propulsion system that does not use an expendable propellant could be developed the cost of doing business in space would be greatly reduced.

Electric propulsion is considered for tasks where low to moderate thrust for an extended period of time is required. Electrical power can be continuously generated on spacecraft with solar panels or nuclear reactors. It would be advantageous to be able to use this power to produce thrust for a spacecraft after it has achieved orbit.

Field propulsion is a propellantless spacecraft propulsion system that uses electrical power and derives its thrust by acting against the Earth's magnetic field. This type of propulsion is also referred to as electrodynamic propulsion. The geomagnetic field is non-uniform in the vicinity of the poles and a few other locations. A Magnetic Sail takes the form of a large area current-carrying loop, or multiple loops of wire; preferably a Superconductor. If a large current passes through this loop in the vicinity of a non-uniform magnetic field, thrust is created. This source of propulsion is known from the prior art of J. F Engelberger "Space Propulsion System" U.S. Pat. No. 3,504,868. Related prior art is "Electromagnetic Ground to Orbit Propulsion Method and Operating System for High Mass Payloads", U.S. Pat. No. 5,093,313.

Throughout most of the Earth's orbital space the geomagnetic field is essentially uniform. A current loop will generate a torque within a uniform field. There are two general methods in the prior art for generating a unidirectional force within a uniform magnetic field. Electrodynamic tethers have their origins in a paper by Drell, Foley, and Ruderman "Drag and Propulsion of Large Satellites in the Ionosphere: An Alfven Propulsion Engine in Space".

Failure Resistant Multiline Tether, U.S. Pat. No. 6,260,807, proposes the use of a very long conductive tether to push against the geomagnetic field in order to create thrust. It is essentially a long conductor that is oriented at right angles to the geomagnetic field, electrically connecting two regions of the ionosphere. A current passes through it, transferring charge between the two regions of the ionosphere. Another method for generating thrust with a tether uses an on board power supply to send current through the tether. In this application the return path for the current is provided by the charged particles surrounding the tether. Electrodynamic tethers have the capability of generating large thrusts, but are difficult to deploy because of their long length.

Spinning Electrodynamic Tethers, U.S. Pat. No. 6,942,186, address some of the tether deployment problems but would require rocket engines to achieve the deployment and to keep the spinning tether in an orientation that would allow it to push against the geomagnetic field.

Combination solar sail and electrodynamic tether propulsion system, U.S. Pat. No. 6,565,044, proposes the use of a solar sail in outer space and a conductive tether to push against the geomagnetic field while in earth orbit to create thrust. This has the same deployment problems as an Electrodynamic Tether and the added difficulties of deploying a solar sail.

In the United States Statutory Invention Registration US004001605, "Supercurrent Bifilar Twister", Leupold discloses methods whereby superconductors can trap magnetic flux and then displace or bend it, thereby changing the potential energy. A bifilar helix formed from superconducting wire is disclosed and its use in the generation of a helical magnetic field is presented.

In the US Patent Application 2009/0314269 "Helical Field Accelerator", Victor et at disclose a magnetic pressure accelerator with helical magnetic structures disposed concentrically that are driven in opposite directions, for the purpose of accelerating a magnetic projectile contained within the interior of the device.

Another method for generating a unidirectional force with a uniform magnetic field is known from the prior art of R. J. R. Ladouceur, Major RCAF "Shielded Coil Electrodynamic Propulsion (SCEP) A Feasibility Study" (1993). This thesis studies the feasibility of using high permeable magnetic shields to isolate sections of a single or multi-turn current loop from an external field. The torque is not completely eliminated with this method.

Another method for SCEP proposes the use of Superconductors for shielding, exploiting the Meissner effect or other properties of Superconductors. Magnetic Floatation Device, patent application 2008/0111655, presents a coaxial Superconductor device. The theory of this device is that if an inner conductor is the return path for a persistent current on the outside the device, only the magnetic field resulting from the outside currents would act on the Earth's geomagnetic field. The conclusion of this theory is that a force vector, which could be utilized as upward thrust, would be generated.

SUMMARY

The invention relates to propulsion systems for spacecraft, and more particularly to a system employing a Superconducting turbine assembly wherein each assembly includes counter-rotating Superconducting rotors that interact with a uniform magnetic field producing thrust.

A main object of this invention is to provide a novel and improved propulsion system for spacecraft which does not use rockets or expendable propellant and only uses electrical power that is readily available from solar panels.

A further object of the invention is to provide an electrical propulsion system for spacecraft that involves relatively simple components, which provides highly efficient operation with minimal mechanical and electrical losses and is compact.

A still further object of the invention is to provide an electrical propulsion system for spacecraft that allows changing a state of motion of a spacecraft from its natural Keplerian motion.

A still further object of the invention is to provide an electrical propulsion system for spacecraft that allows changing the altitude of a spacecraft.

A still further object of the invention is to provide an electrical propulsion system for spacecraft that can extract useable power from the orbital energy of a spacecraft.

Further objects and advantages of the invention will become apparent from the following description and claims, and from the accompanying drawings wherein:

DETAILED DESCRIPTION

Figure 1A:
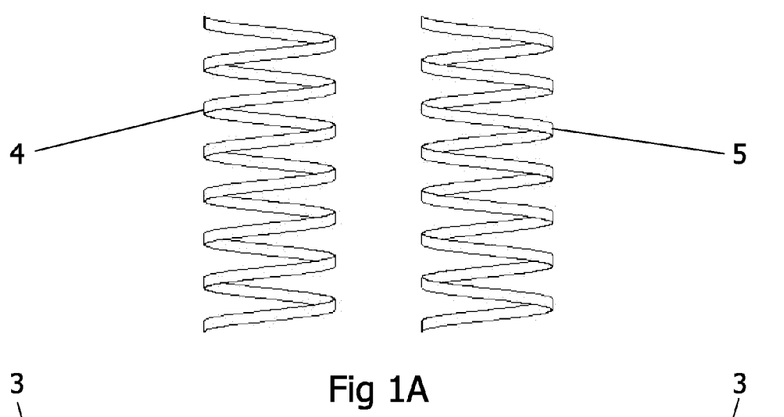
FIG. 1A and FIG. 1B. illustrate the first embodiment of the Superconducting electrodynamic turbine (SET) in a simplified form.

FIG. 1A—First Embodiment

FIG. 1A is a simplified illustration of the first embodiment of the SET, comprising a pivotably disposed right-handed Superconducting helix, 4 and a pivotably disposed left-handed Superconducting helix, 5. The helixes 4, 5, can consist of helically wound High Temperature Superconductor (HTS) wire, which could be American Superconductor's High Strength Plus wire, part number 5705. Other types of Superconductors, such as a plated YBCO film are also suitable as the active part of the helixes and the use of HTS wire in this embodiment is not to be construed as a limitation thereof. The HTS wire, thin film or other form of Superconductor that are the active component of the helixes has a rectangular cross-section, with the large dimension disposed parallel with the axis of the helix. The Superconducting helixes can consist of a plurality of individual discoid, wafer, or rectangular shaped sections of a Superconductor assembled into a helix shape, such that the flat surface of the Superconductor sections are aligned tangent to the envelope of the helix. In addition the Superconducting helixes can also be formed as deposited films on a suitable tubular or cone-shaped substrate, and by other suitable methods. The ends of all Superconducting helixes are unconnected and it is not a requirement that the Superconducting helixes be Superconductors at every point along their full length. The Superconducting helixes are disposed such that their axes of rotation are aligned at right angles or at an oblique angle to the exciting external magnetic field. There is also a means for applying a rotational drive to all the Superconducting helixes.

Figure 1B:
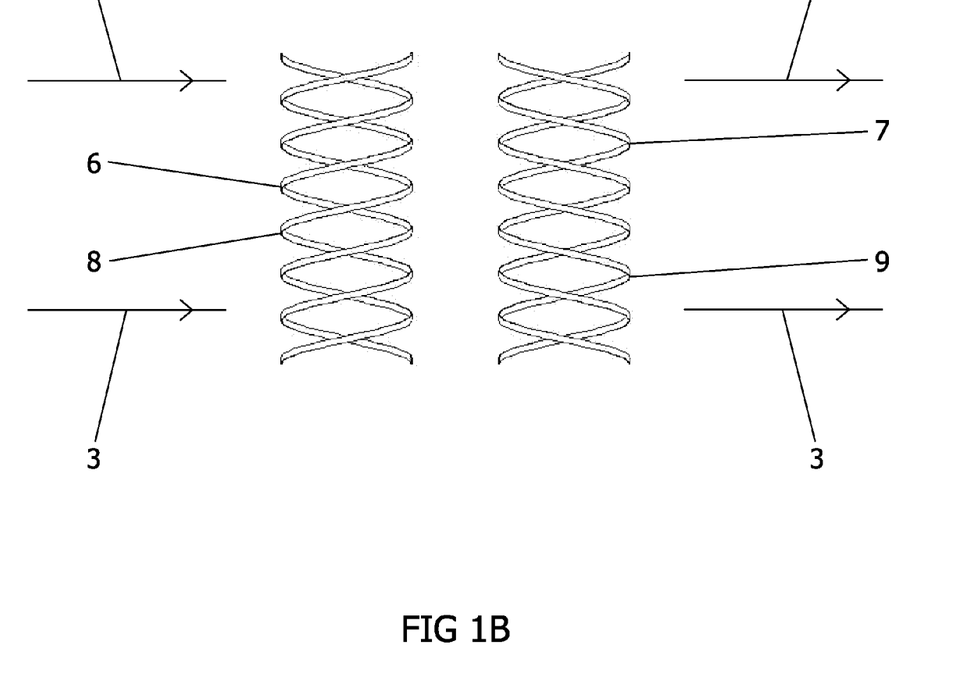

FIG. 1B—First Embodiment

FIG. 1B illustrates a bifilar right-handed Superconducting helix, 6, 8, and a bifilar left-handed handed Superconducting helix, 7, 9. The individual helix filaments of said Superconducting helixes are disposed with equal spacing, have the same diameter, and have a common rotational axis. Trifilar, quadrifilar and Superconducting helixes with even more filaments have these same features and shall be referred to herein, along with the aforementioned difilar and bifilar forms, collectively as left-handed or right-handed Superconducting helixes. A set of Superconducting helixes comprising at least one right-handed Superconducting helix with a plurality of filaments and an equal number of left-handed Superconducting helixes with the same number of filaments, with all the Superconducting helixes held in a fixed and parallel position relative to each other, produces thrust when the right-handed Superconducting helixes are rotated in one direction and the left-handed Superconducting helixes are rotated in the opposite direction within a magnetic field. Referring to FIG. 1B, the preferred direction of the exciting magnetic field, 3, is at right angles to the axis of rotation of the Superconducting helixes. A difilar right-handed Superconducting helix in combination with a difilar left-handed Superconducting helix can also create thrust when they are rotated in opposite directions within a magnetic field. These properties of Superconducting helixes will be elucidated and proven in the appropriate place in this specification.

Figure 2:
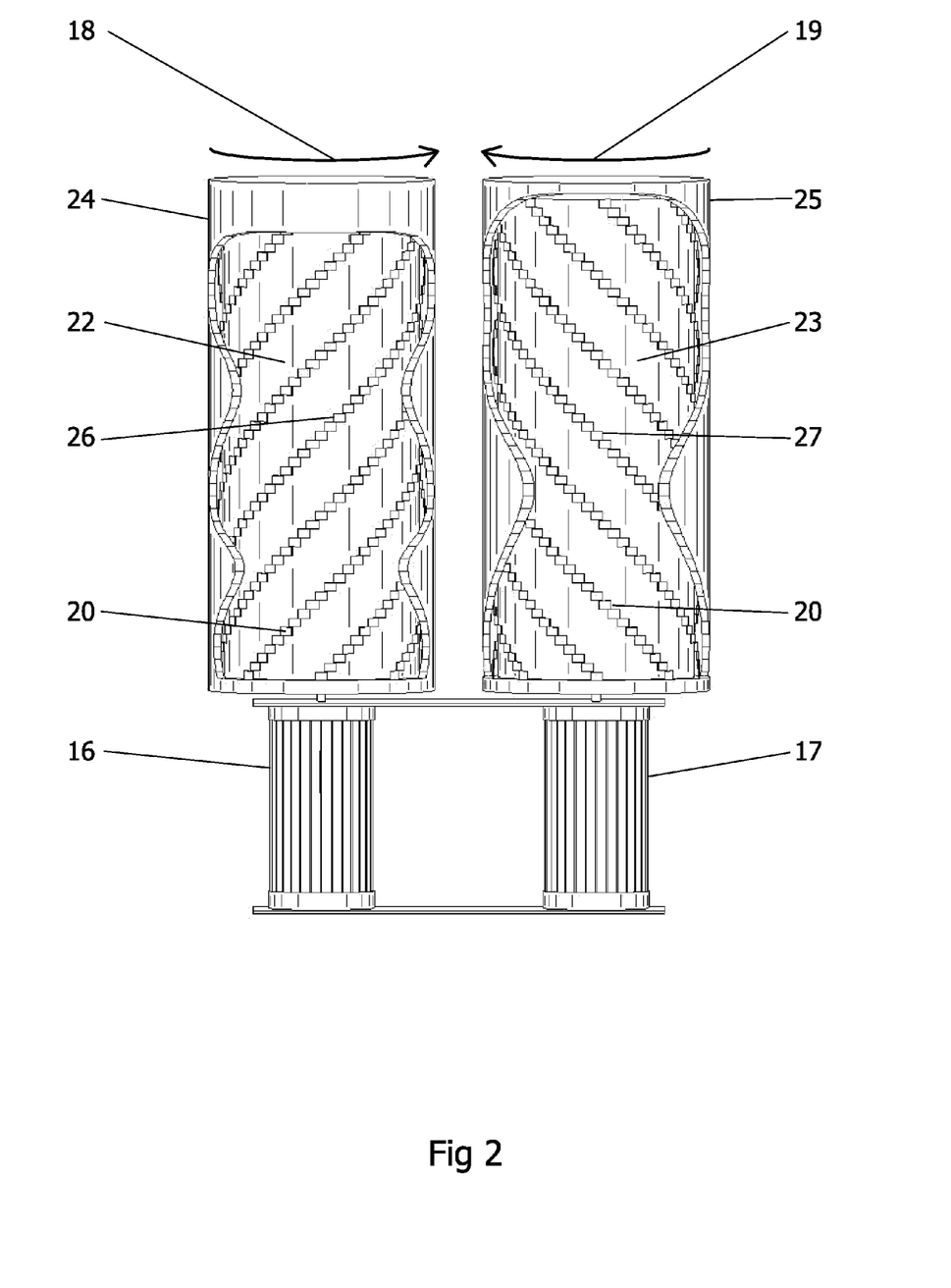
FIG. 2 illustrates the second embodiment of the SET with more detail.

FIG. 2—Second Embodiment

FIG. 2 illustrates two sets of helixes with opposite chirality, 26, 27 that are composed of rectangular shaped sections of a Superconductor, 20. The rectangular shaped sections can be fabricated from a high temperature Superconductor cable. The American Superconductor's High Strength Plus wire, part number 5705 that was mentioned earlier with respect to the solid helix configuration of the invention has proven to be suitable. Other types of metal clad second generation high temperature Superconductor cable may also be suitable. The rectangular shaped sections of a Superconductor are disposed tangent to and are fastened to the outer surfaces of the inner cylinders, 22, 23, that are made from fiberglass, garolite, kevlar or some other material that has sufficient strength for this application, provides the overall structural support, and provides an inner temperature insulating layer for maintaining very low temperatures inside the device.

Outer cylinders, 24, 25 that are shown in FIG. 2 in a partial cut away view are mechanically attached to the inner cylinders, 24, and 25 respectively and provide a narrow gap between the inner cylinders and outer cylinders for the circulation of liquid Nitrogen to cool the Superconductor. The outer cylinders, 24, 25 are made from fiberglass, garolite, kevlar or some other material that has sufficient strength for this application and provides an outer temperature insulating layer for maintaining very low temperatures inside the device. Cylinders 22, 24, and 23, 25 are all approximately the same length.

A means of applying a rotational drive to the cylinders 22, 24 and 23, 25 and the Superconducting helixes that are affixed to cylinders 24 and 23, using motors 16, and 17 such that the mechanically connected cylinders 22, 24 and the mechanically connected cylinders 23, 25 are made to rotate at approximately the same absolute valued angular velocity and in opposite directions as indicated by the directional arrows 18, 19 in FIG. 2. This means of applying a rotational drive to the two sets of helixes also provides a way to speed up or slow down the absolute valued angular velocity of the two helixes while maintaining approximately equal and opposite rotational rates. The rotations of the cylinders 22, 24 and 23, 25 and the Superconducting helixes that are affixed to them can also be stopped and restarted in opposite directions.

A means of circulating liquid Nitrogen through the device is provided so that the liquid Nitrogen will cover the Superconducting helixes affixed to the inside of cylinders 22, 23 cooling them sufficiently to maintain their Superconductive state, as the cylinders rotate. Details of the design of the cylinders 22, 23 and the rotation of said cylinders forces the liquid Nitrogen to uniformly coat the Superconducting helixes. The outer cylinders, 24, 25, provides an outer temperature insulating layer for maintaining very low temperatures inside the device. Other methods of maintaining a low temperature such that the Superconducting helixes are maintained below the critical temperature, Tc and is kept in a Superconductive state may also be utilized.

FIGS. 2A AND 2B—Third Embodiment

Figures 3A, 3B:
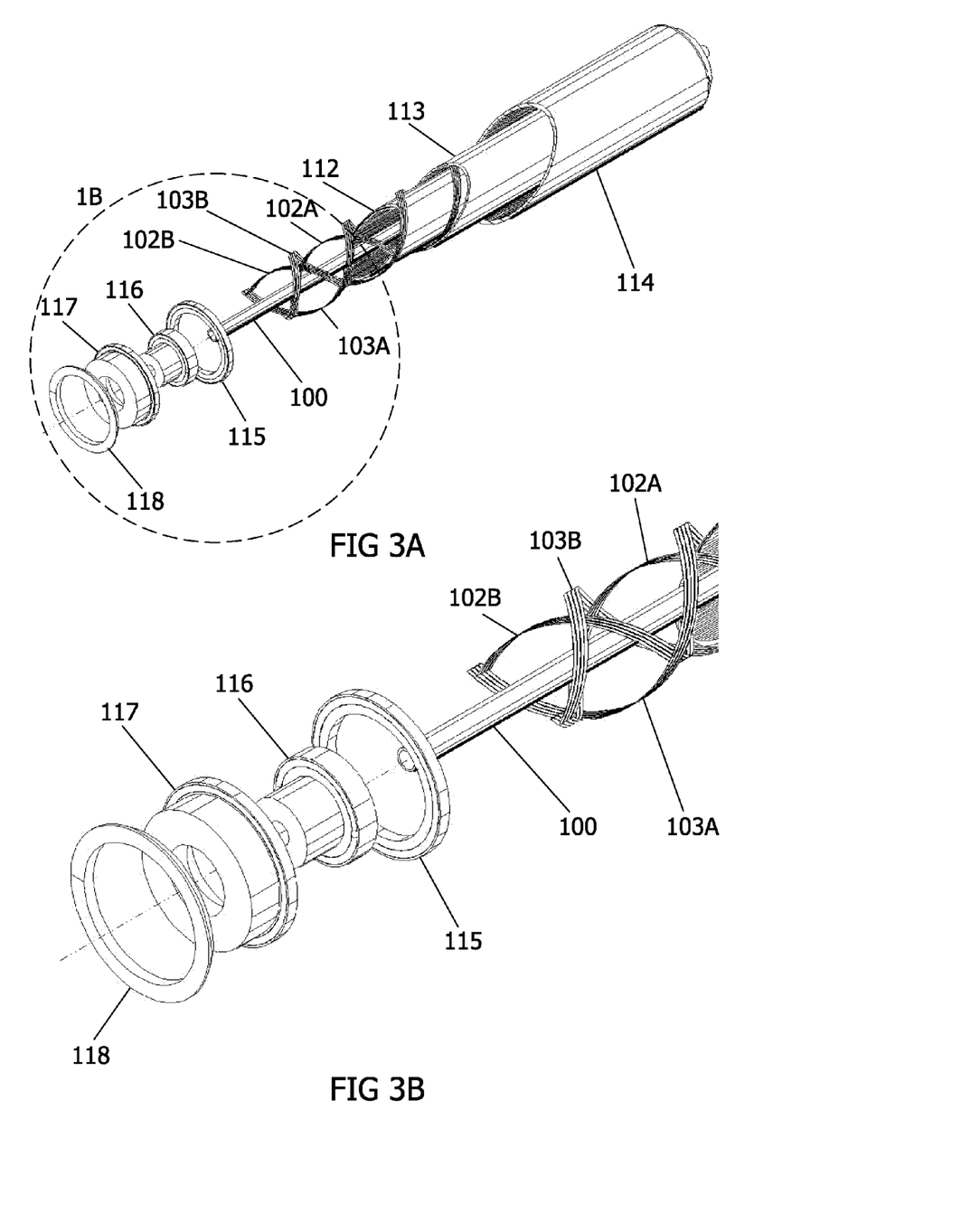
FIG. 3 illustrates the third embodiment of the SET wherein the helixes are concentric.

FIG. 3A, 3B illustrate the third embodiment of the SET whereby the opposite-handed Superconducting helixes are disposed concentric. It is tubular shaped with drive pulleys at both ends. At the center axis is a shaft, 100. An inner drive pulley, 116, is located on and is free to rotate on said shaft. An outer drive pulley, 117, is supported on and is free to rotate on said inner drive pulley. An outer casing, 114, made from fiberglass, garolite, kevlar or some other material that has sufficient strength for this application, provides the overall structural support, and provides an outer temperature insulating layer for maintaining very low temperatures inside the device.

Bearing tracks 115, 118 are attached to said outer casing and provide low friction rotational support for said outer drive pulley. A tube, 112, made from fiberglass, garolite, kevlar or some other material that has sufficient strength for this application, is attached to said inner drive pulley and is capable of independent rotation when a means of rotational drive is applied to said inner drive pulley. A tube, 113, made from fiberglass, garolite, kevlar or some other material that has sufficient strength for this application, is attached to said outer drive pulley and is capable of independent rotation when a means of rotational drive is applied to said outer drive pulley. There is a similar drive pulley and bearing configuration at the opposite end. The dual pulleys at each end provide a means for applying separate rotational drives to the tubes 112, 113.

The outer casing, 114, and two tubes, 112, 113, are shown in a partially cut away view. This is done simply to reveal the internals of the device. Tubes 112, 113, and 114 are all approximately the same length as the central shaft, 100.

Attached to the inner surface of the tube 112, along most of its length is a right-handed Superconducting helix, 102A, 102B. Attached to the inner surface of the tube 113 along most of its length is a left-handed Superconducting helix 103A, 103B, with the same pitch, similar composition and a larger diameter than the right-handed Superconducting helix. The outer, larger diameter helix, 103A, 103B, has a small percentage less Superconductor per linear length along each helix, compared to 102A, 102B. This difference between the inner and the outer helixes is to equalize the electrodynamic torques produced when the helixes rotate in the presence of a magnetic field. The Superconducting helix 102A, 102B is identified as being right-handed in the above description and the Superconducting helix 103A, 103B is identified as being left-handed. This assignment is not a functional requirement for the invention. Alternatively 102A, 102B could be left-handed and 103A, 103B could be right-handed. Any alternative methods of mounting or attaching a suitable Superconductor or sections of Superconductor to a suitable substrate so as to form concentric opposite-handed Superconducting helixes that can be independently rotated is also representative of the first embodiment of the invention.

A means of applying a rotational drive to the tubes 112, 113, and the Superconducting helixes that are affixed to them, using the drive pulleys 116, and 117 is provided such that the tubes are made to rotate at the same absolute valued angular velocity and in opposite directions. This means of applying a rotational drive to the two sets of helixes also provides a way to speed up or slow down the absolute valued angular velocity of the two helixes while maintaining equal and opposite rotational rates. The rotations of the two tubes 112, 113, and the Superconducting helixes that are affixed to them can also be stopped and restarted in opposite directions. There is also a means for adding or subtracting small phase increments to either rotating assembly.

A means of circulating liquid Nitrogen through the device is provided so that the liquid Nitrogen will cover the Superconducting helixes affixed to the inside of tubes 102, 103, cooling them sufficiently to maintain their Superconductive state, as the tubes rotate. Details of the design of the tubes 102, 103, and the rotation of said tubes forces the liquid Nitrogen to uniformly coat the Superconducting helixes. The outer casing, 114, provides an outer temperature insulating layer for maintaining very low temperatures inside the device. Other methods of maintaining a low temperature such that the Superconducting helixes are maintained below the critical temperature, Tc and is kept in a Superconductive state may also be utilized.

Figure 4A:
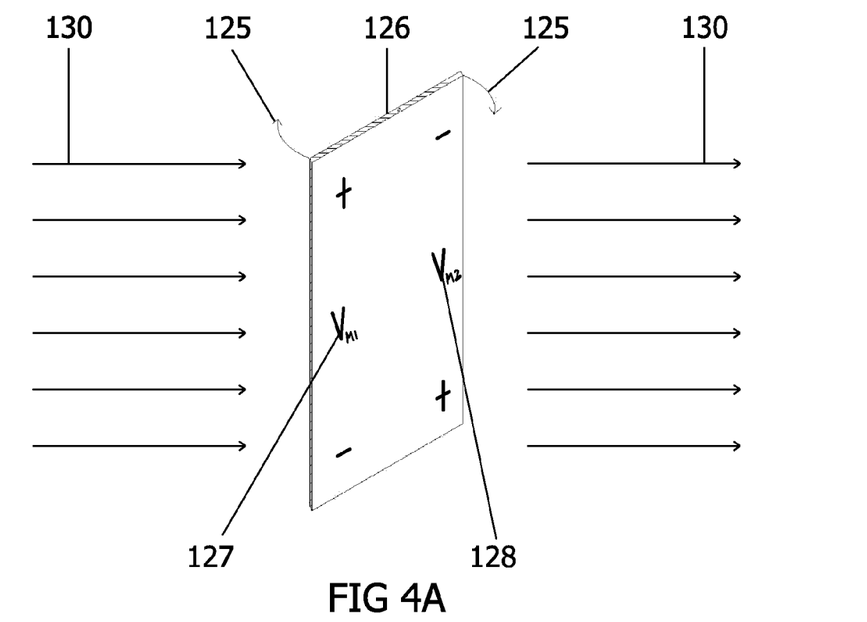
FIG. 4A illustrates the generation of motional EMF when a conductor rotates in a magnetic field.
Figure 4B:
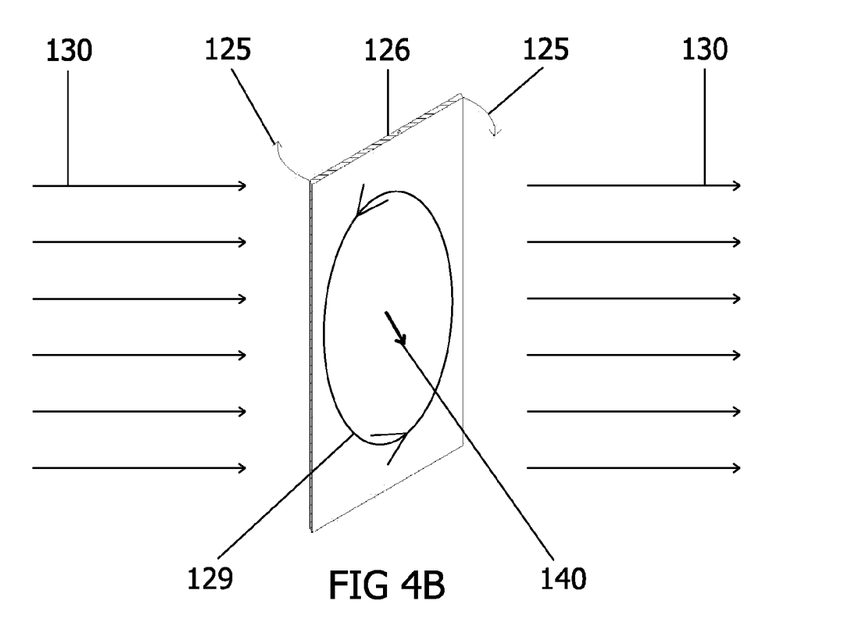
FIG. 4B illustrates the generation of eddy currents when a conductor rotates in a magnetic field.

FIGS. 4A and 4B—Description of Motional EMF

FIG. 4A shows a conductor, 126, rotating about its center, indicated by 125, in a uniform magnetic field, 130; referred to here as the exciting magnetic field. The motion of the conductor at right angles to the exciting magnetic field generates a motional Electromotive Force (EMF), or voltage, 127, 128, on two sides of the conductor. The two voltages have opposite polarities because the two sides of the conductor are moving in opposite directions, relative to the exciting magnetic field.

FIG. 4B shows the resulting induced current, also referred to as an eddy current, 129. Lenz's Law states that an induced current is always in such a direction as to oppose the motion or change causing it. The induced current produces a magnetic field, 140. The rotating conductor exerts a torque against this resisting force which arises from the interaction of the induced magnetic field, 140 and the exciting magnetic field, 130. The application of this torque on the exciting magnetic field transfers rotational energy, or angular momentum, from the rotating conductor to the exciting magnetic field. In the case of a conductor that has resistance, some of the angular momentum of the rotating conductor is converted to heat, due to resistive losses. A Superconductor has no resistance and therefore has no such losses. When an eddy current is induced in a Superconductor, this eddy current will persist for an indefinite time if the motional EMF, or voltage that produced the eddy current decreases to zero.

This effect is related to the Meissner Effect. Both involve circulating currents. However the Meissner Effect occurs when a non-uniform exciting magnetic field induces persistent direct current surface currents in a Superconductor that is not moving relative to the magnetic field. The eddy currents that are generated in the Superconducting helixes are alternating currents that are induced because the helixes are rotating within a uniform magnetic field. The magnitude and direction of the eddy currents in the Superconducting helixes change with the rotation.

Figure 5A:
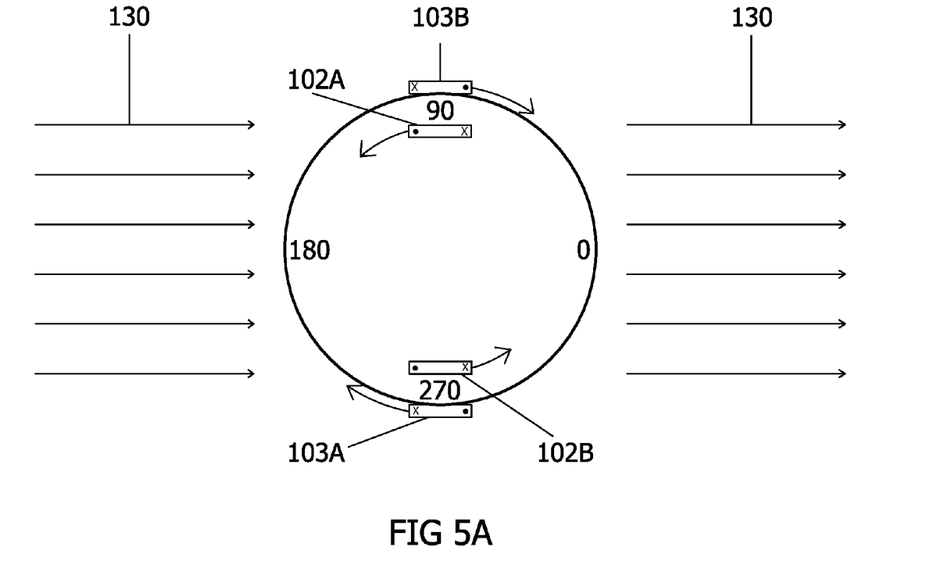
FIG. 5A shows the generation of eddy currents by Superconducting helixes rotating in a magnetic field.
Figure 5B:
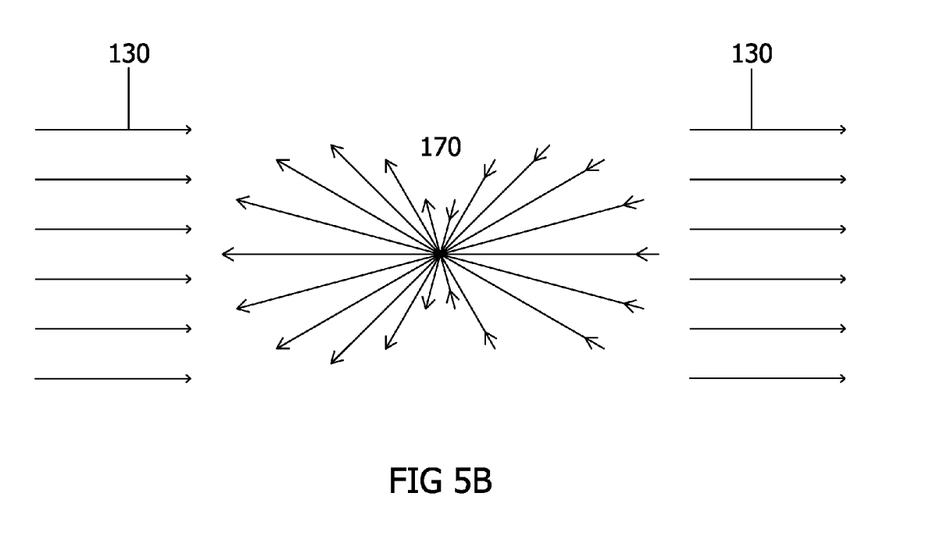
FIG. 5B shows the relative magnitude and direction of the magnetic field induced in a Superconducting helix that is rotating in an external exciting magnetic field.

FIGS. 5A and 5B—Description of Persistent Currents in Superconductors

FIG. 5A is a simplified sectional diagram of two counter-rotating Superconducting helixes, 102A, 102B, 103A, 103B, in a uniform magnetic field, 130. The inner Superconducting helix, 102A, 102B is rotating counter-clockwise as it moves in a circular path, indicated by the arrows. The outer Superconducting helix, 103A, 103B rotates clockwise. The direction of the eddy current produced on opposite sides of the Superconductors is indicated by the "X" and "•" symbols, with "X" being current into the page and "•" being current out of the page.

When a section of the Superconducting helix passes through the 90° or 270° position of FIG. 5A, the movement of the opposite sides with respect to the exciting magnetic field, 130, is at a maximum. The motional EMF generated at the 90° and 270° positions is also at a maximum and is at a minimum at the 0° and 180° positions. The amplitude of the motional EMF, $V_{EMF}$ generated in each Superconducting helix section varies according to the position of the Superconducting helix section with respect to the magnetic field.

$$V_{EMF} = BL\omega \sin(\Theta)$$

where
$\Theta$=the rotation angle of the helix
B=the magnetic field, L=length
$\omega$=the angular velocity The motional EMF has a maximum amplitude when $\Theta$=90° and 270°.

A Superconductor has no resistance and the magnitude and direction of the eddy current generated by the motional EMF is proportional to the integral over time of the motional EMF:

$$I_{Eddy} = K\int V_{EMF} d\Theta = -KBL\omega \cos(\theta)$$

The induced eddy current has a maximum amplitude when $\Theta$=0° and 180°. The eddy current in a Superconductor and the magnetic field generated by the eddy current lag the motional EMF by 90°. FIG. 5B is a vector representation, 170, of the magnetic field induced in each rotating section of Superconductor by the exciting magnetic field, 130. The induced magnetic field opposes and is at a maximum when the direction of travel of the Superconducting helix is at right angles to the exciting magnetic field. When a section of one of the Superconducting helixes approaches that position (0° and 180° in FIG. 5A}, the induced magnetic field increases in strength. When it is moving away from those positions the induced magnetic field decreases in strength. At the 90° and 270° positions in FIG. 5A, the eddy current and the induced magnetic field go to zero and then reverse direction.

These characteristic of the induced magnetic field in a section of Superconductor that is rotating in an exciting magnetic field applies equally to clockwise and counter-clockwise rotations. The eddy current is always in the plane of the Superconducting helix section and the induced magnetic field is perpendicular to the plane of the Superconducting helix section and it opposes the exciting magnetic field.

By Lenz's Law it is known that the induced eddy current produces a magnetic field that opposes the relative change in the exciting magnetic field. When a rotating section of Superconducting helix sweeps across the magnetic field lines (0° and 180° positions in FIG. 5A), the exciting magnetic field is compressed. This is because the induced magnetic field is increasing in strength and because of the movement of the section of Superconducting helix.

The trailing edges have the opposite effect. They pull the magnetic field lines along behind them, making it less compressed. This occurs because the induced magnetic field in the Superconducting helix section is decreasing in strength and is moving away.

Figure 6:
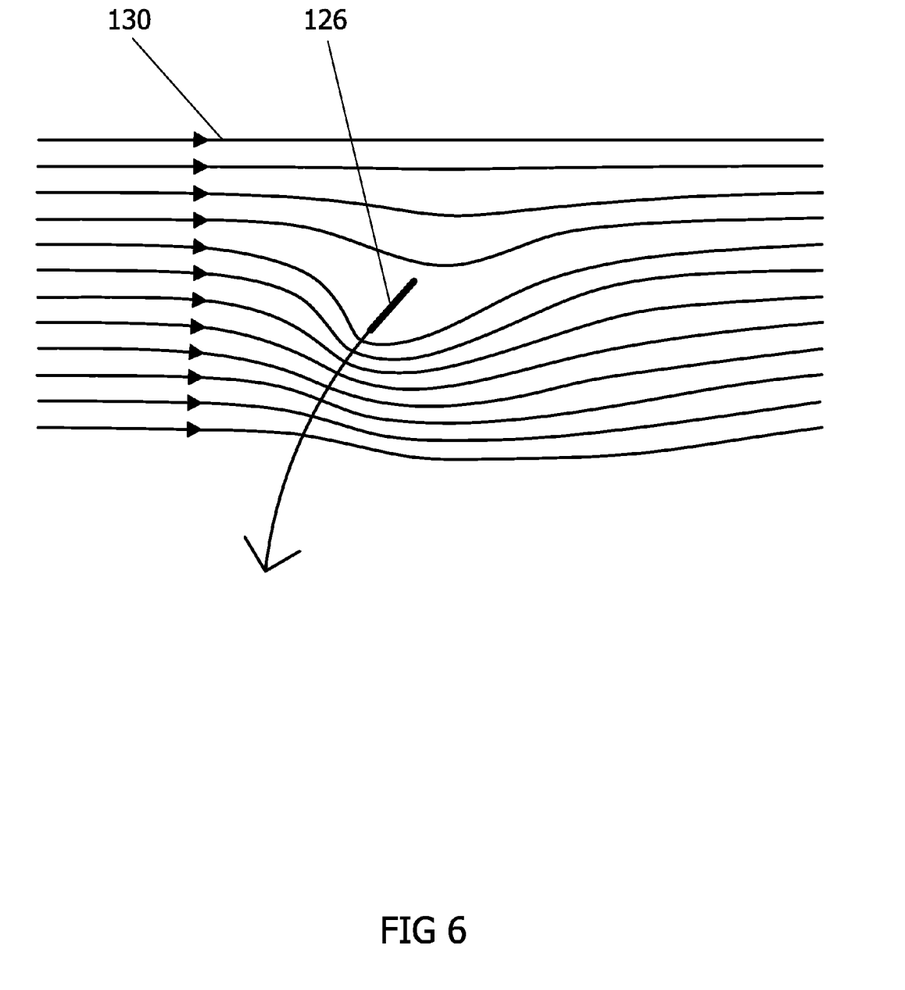
FIG. 6 shows how an external magnetic field is altered at the leading and trailing edges of a section of Superconductor that rotates across the field.

FIG. 6—Interaction of HTS with an External Magnetic Field

FIG. 6 illustrates a Superconducting helix segment, 126, moving in a circular trajectory through a uniform magnetic field, 130. The effect of this compound movement of the Superconducting helix segment on the magnetic field is to compress the magnetic field at the leading edge of the HTS and to make the magnetic field less compressed at the trailing edge. This is a direct effect of Lenz's Law. Every segment of a Superconducting helix will undergo a full rotation each time the Superconducting helix rotates. Whenever a Superconducting helix segment sweeps across the magnetic field, work is done by the rotating Superconducting helix on the magnetic field, as detailed in the description of FIGS. 4A, 4B. This work will be coupled to the source of the magnetic field.

As the Superconducting helix segments of FIG. 2 rotate in a uniform magnetic field, a retarding force or torque is generated. To overcome this torque and maintain a constant angular velocity, kinetic energy has to be added to each rotating Superconducting helix.

As energy is continually added to the rotating helixes, the angular momentum of the rotating Superconducting helixes does not increase at the same rate if the magnetic field is not present. Therefore work is being done on the magnetic field and ultimately the magnetic field's source. FIG. 6 shows how a uniform external magnetic field is compressed at the leading edge and is expanded at the trailing edge of Superconducting helix segments that move in a circular trajectory.

Embodiment 2, as portrayed in FIG. 2, has a multiplicity of Superconducting segments that are attached to cylinders to form helical shapes. When a magnetic field passes through the rotating Superconducting helixes a stronger magnetic field will be present along the leading edge of each helix and a weaker magnetic field will be present along the trailing edge of each helix. Similarly, in the case of the invention as portrayed in FIGS. 3A, 3B, wherein the helixes consist of solid HTS cable, the eddy currents induced in the solid cable as the HTS helixes rotate in a magnetic field will result in a stronger magnetic field along the leading edge of each HTS helix and a weaker magnetic field along the trailing edge of each HTS helix. A property of Superconductors is the total exclusion of weak magnetic fields. The stronger magnetic field along the leading edge of each HTS helix cannot pass through the closely arranged HTS segments, 20, shown in FIG. 2 of the invention, or the solid HTS cable, 100, 101, 102A, 102B, 103A, 103B, shown in FIG. 1 and FIG. 3. This results in a force that is directed at right angles to the helix angle, from the leading edge of the each helix to its trailing edge, wherever the helix cuts across the external magnetic field.

Figure 7A:
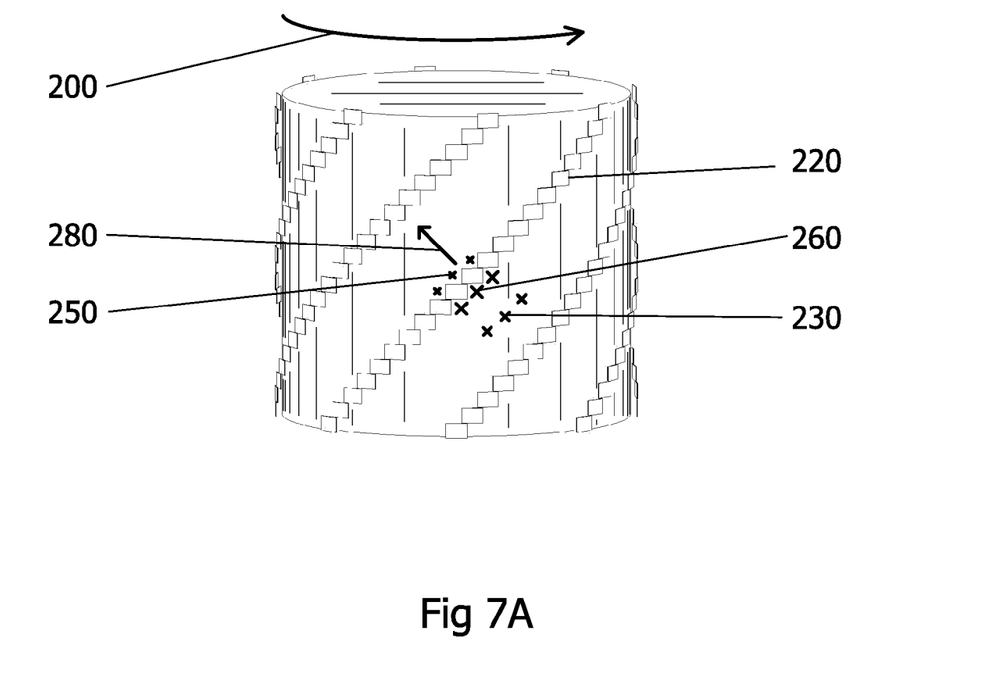
FIG. 7A shows the forces generated on a section of a Superconducting helixes that is rotating within an external magnetic field.

FIG. 7A is a simplified illustration of part of embodiment 2 of the SET wherein the right-handed Superconducting helixes, 220, are driven by a motor and are made to rotate counter-clockwise, as indicated by 200. A uniform external magnetic field is directed at right angles to the axis of the helixes and into the plane of the figure. The external magnetic field, 230 is represented by an "X". The larger "X", 260, represents the increased magnetic field at the leading edge of one section of one of the helixes. On the corresponding trailing edge is a smaller "X", 250, that represents the weaker magnetic field. The resulting force, 280, is portrayed as a vector that is at right angles to the helix angle. At each segment of all the helixes that are sweeping across the external magnetic field there is a force that is tangent to the helix and at right angles to the helix.

Figure 7B:
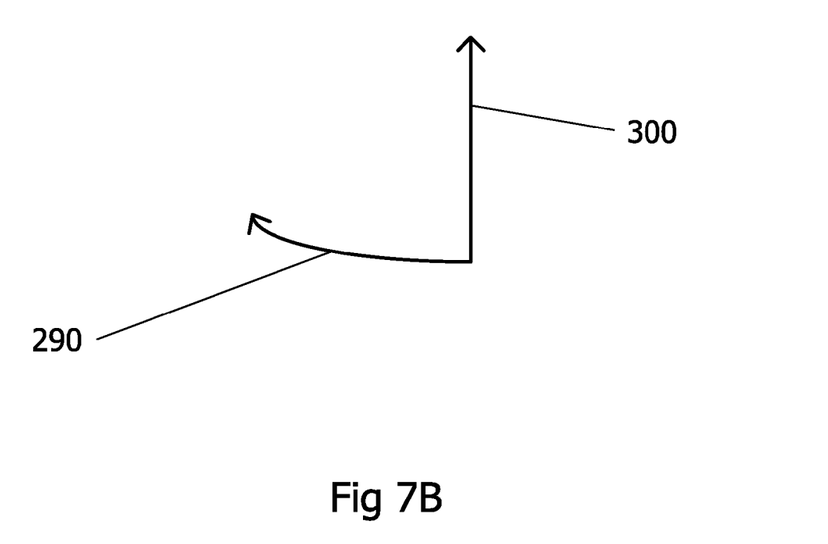
FIG. 7B shows the vector sum of the forces.

FIG. 7B illustrates the integral of all the forces acting on the Superconducting helixes as they rotate in an external magnetic field. There is a clockwise torque, 290, and a linear force, 300, that is directed vertically. If a similar-sized left-handed Superconducting helix that is driven by a motor and rotates clockwise is considered the resulting integral of all the forces acting on the Superconducting helixes would be a counter-clockwise torque and a linear force that is also directed vertically. The embodiments shown in FIGS. 1, 2, and 3 produce a net linear force and equal but opposite torques. The torques are in the opposite direction to the rotational drives of the two Superconducting helixes and therefore represent power loss. The rotational kinetic energy of the Superconducting helixes is translated into a linear force as momentum is transferred to the external magnetic field An equal and opposite force is applied to the source of the external magnetic field.

Figure 8A:
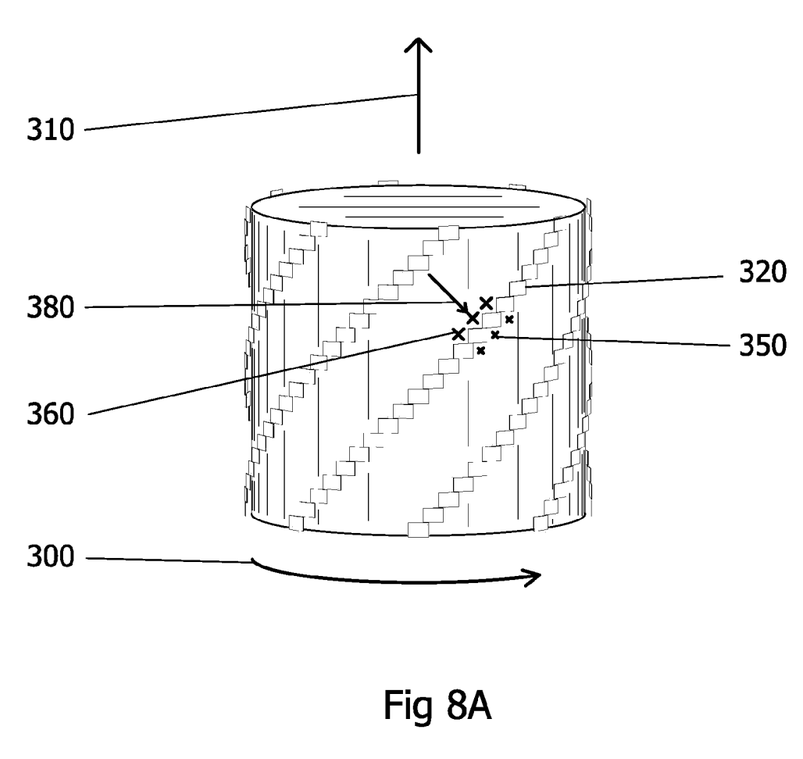
FIG. 8A shows the forces generated on a section of a rotating Superconducting helixe that move with respect to an external magnetic field.

FIG. 8A is a simplified illustration of part of embodiment 2 of the SET wherein the right-handed Superconducting helixes, 320, are freely rotating counter-clockwise, as indicated by 300. A uniform external magnetic field is directed at right angles to the axis of the helixes and into the plane of the figure. The device has a velocity, represented by the velocity vector 310, with respect to the external magnetic field. The magnetic field enters the space between helixes and is concentrated, indicated by the larger X, 360, against the trailing edge of the helixes. On the corresponding leading edge is a smaller "X", 350, that represents the weaker magnetic field. The differential magnetic field on opposite sides of the helixes results in a force, 380, that is at right angles to the helix angle.

Figure 8B:
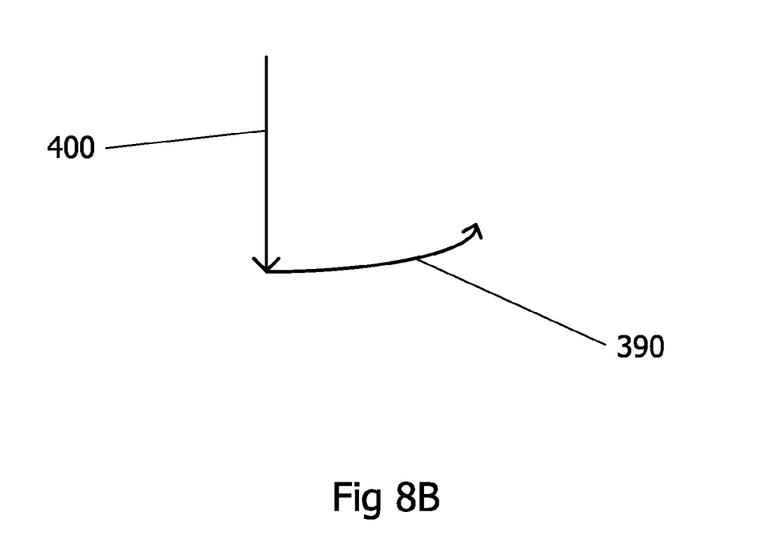
FIG. 8B shows the vector sum of the forces.

FIG. 8B illustrates the integral of all the forces acting on the Superconducting helixes from the interaction with an external magnetic field. There is a counter-clockwise torque, 390, and a linear force, 300, that is directed in the opposite direction of the velocity vector, 310. Here the torque increases the angular velocity, represented by 300, of the rotating helixes and the linear force reduces the velocity with respect to the magnetic field, 310. The momentum of the Superconducting helixes is translated into a angular momentum and momentum is transferred to the external magnetic field A force is produced that reduces the velocity of the rotating Superconducting helixes. An equal and opposite force is applied to the source of the external magnetic field.

The invention produces thrust by constraining portions of an exciting magnetic field and forcing it to be displaced in one direction. This transfers momentum to the magnetic field's source. If the direction of rotation of both Superconducting helixes is reversed, the force vector is reversed. The magnitude of the force produced is proportional to the rotational speed of the Superconducting helixes. The thrust can be increased by increasing the rotational rate of the Superconducting helixes.

This momentum transfer is reversible. If angular momentum is constantly being added by applying electrical power to the motors attached to the opposite-handed Superconducting helixes of the SET, as illustrated in FIG. 2, some of the added angular momentum is lost as momentum is transferred to the magnetic field. If the SET is free to move in response to the force, 300, shown in FIG. 7, then the device accelerates. In this way the SET can use electrical energy to increase the velocity of an orbiting satellite, raising it to a higher orbit. If the rotating helixes are connected to a generator and electrical power extracted from the rotation of the helixes, the velocity of the satellite will decrease.

Scaling Factors

This device produces thrust by using a magnetic field to transfer momentum to the magnetic fields source. A strong field, or a field that is more concentrated will allow a larger thrust to be produced. The magnitude of the geomagnetic field cannot be changed but magnetic fields can be concentrated with high permeable materials. If more of the magnetic field is transported with this device, in a given time period, a larger force will be produced. A faster rotation rate results in more magnetic field being transported per unit time, producing a larger force. Increasing the diameter of the Superconducting helixes will also increase the force produced. Each of these force scaling factors: rotational speed, permeability, length, diameter, as well as the density of Superconducting helixes proportionally increase the force that is generated.

Advantageous embodiments of the invention are discussed in the depending claims. The features recited in depending claims are mutually freely combinable unless otherwise explicitly stated. The exemplary embodiments of the invention presented in this patent application are not to be interpreted to pose limitations to the applicability of the appended claims. The verb "comprising" is used in this patent application as an open limitation that does not exclude the existence of unrecited features.

The novel features which are considered as characteristic of the invention are set forth in particular in the appended claims. The invention itself however, both as to its construction and its method of operation, together with additional objects and advantages thereof, will best be understood from the preceeding description of specific embodiments when read in connection with the accompanying drawings. The drawings are schematic only and are not drawn to scale.

GLOSSARY

Bifilar Helix—A helix that has two filaments that are equally spaced.

Difilar Helix—A helix that has one filament.

Electrodynamic—The physical effects relating to the interaction of moving or current carrying conductors in a magnetic field.

HTS—High Temperature Superconductor. An oxygenated rare-earth compound that has no electrical resistance at temperatures near 100 degree Kelvin and below.

Meissner Effect—A property of superconductors whereby a magnetic field is excluded from passing through the superconductor.

Motional EMF—The voltage that is produced in a conductor that is moving in a magnetic field.

Persistent Current—An electrical current in a superconductor that continues to flow for an indefinite time after being started.

Superconducting Helix—A rigid helix made from a superconductor, preferably a high temperature superconductor, with a rectangular cross-section. The superconducting helix, has persistent eddy currents induced in it when rotated in a magnetic field.

The invention claimed is:

1. A superconducting rotating machine comprising:
   a. at least one right-handed superconducting helixes, and
   b. said right-handed superconducting helixes being pivotably disposed, and
   c. said right-handed superconducting helixes having an axis of rotation along the lengthwise center of radius of said right-handed superconducting helixes, and
   d. at least one left-handed superconducting helixes, and
   e. said left-handed superconducting helixes having an axis of rotation along the lengthwise center of radius of said left-handed superconducting helixes, and
   f. said right-handed superconducting helixes and said left-handed superconducting helixes being constructed using a high temperature superconductor material, and
   g. means for holding said axis of rotation of said right-handed superconducting helixes and said axis of rotation of said left-handed superconducting helixes substantially parallel and in a fixed position, and
   h. said right-handed superconducting helixes and said left-handed superconducting helixes being disposed in an external magnetic field, and
   i. rotational drive means applied to said right-handed superconducting helixes and said left-handed superconducting helixes for producing opposite direction rotation of said right-handed superconducting helixes and said left-handed superconducting helixes, and
   j. cryogenic cooling means applied to said right-handed superconducting helixes and said left-handed superconducting helixes for cooling said right-handed superconducting helixes below the critical temperature of said high temperature superconductor, Tc, and
   k. the rotation of said right-handed superconducting helixes and said left-handed superconducting helixes across an external magnetic field induces eddy currents and opposing magnetic fields within the superconductors, and
   l. said induced eddy currents and opposing magnetic fields within the superconductors displaces said external magnetic field into a stronger part at the leading edge of said superconducting helixes and a weaker part at the trailing edge of said superconducting helixes, and
   m. said stronger part of the magnetic field and said weaker part of the magnetic field produce, by the principle of the Meissner effect, a force on said superconducting helix that is at right angles to the helix angle and at all locations that said eddy currents are induced, and
   n. said forces at all locations that said eddy currents are induced when combined produce a torque that opposes the rotation of said helixes and a linear thrust.

2. The superconducting rotating machine according to claim 1,
   a. wherein said rotational axis of said right-handed superconducting helixes and said rotational axis of said left-handed superconducting helixes are disposed coincident, and
   b. wherein said right-handed superconducting helixes and said left-handed superconducting helixes are disposed concentric.

whereby said right-handed superconducting helixes and said left-handed superconducting helixes, when rotated in opposite directions, produce thrust by displacing an exciting magnetic field.

3. The superconducting rotating machine according to claim 1,
   a. wherein said right-handed superconducting helixes and said left-handed superconducting helixes are coupled to and are driven by electric motors.

4. The superconducting rotating machine according to claim 1,
   a. wherein said right-handed superconducting helixes and said left-handed superconducting helixes are coupled to and supply rotational power to electric generators.

5. The superconducting rotating machine according to claim 1,
   a. wherein said right-handed superconducting helixes and said left-handed superconducting helixes are composed of a multitude of individual segments of high temperature superconductor, and
   b. said segments of high temperature superconductor are disposed tangential to a cylinder that delineates the outer surfaces of said helixes and
   c. said segments of high temperature superconductor are disposed closely adjacent and overlapped.

* * * * *